United States Patent
Hamamura et al.

(10) Patent No.: US 11,010,514 B2
(45) Date of Patent: May 18, 2021

(54) GROUPING OF PAULI STRINGS USING ENTANGLED MEASUREMENTS

(71) Applicant: INTERNATIONAL BUSINESS MACHINES CORPORATION, Armonk, NY (US)

(72) Inventors: Ikko Hamamura, Kyoto (JP); Takashi Imamichi, Bunkyo-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/739,822

(22) Filed: Jan. 10, 2020

(65) Prior Publication Data

US 2020/0242290 A1   Jul. 30, 2020

(30) Foreign Application Priority Data

Jan. 24, 2019   (JP) .............. JP2019-010284

(51) Int. Cl.
*G06F 30/32* (2020.01)
*G06N 10/00* (2019.01)
*G06F 111/10* (2020.01)

(52) U.S. Cl.
CPC .......... *G06F 30/32* (2020.01); *G06N 10/00* (2019.01); *G06F 2111/10* (2020.01)

(58) Field of Classification Search
CPC ...... G06F 30/32; G06F 2111/10; G06N 10/00
USPC ....................... 716/100, 101, 102
See application file for complete search history.

(56) References Cited

U.S. PATENT DOCUMENTS

| | | | |
|---|---|---|---|
| 2017/0351967 A1 | 12/2017 | Babbush et al. | |
| 2020/0057957 A1* | 2/2020 | Johnson et al. | G06N 10/00 |
| 2020/0104740 A1* | 4/2020 | Cao et al. | G06F 15/16 |

FOREIGN PATENT DOCUMENTS

WO   2018/080553   5/2018

OTHER PUBLICATIONS

Sergey Bravyi et al., "Tapering off qubits to simulate fermionic Hamiltonians", arXiv:1701.08213v1 [quant-ph], Jan. 2017.
Jean-François Cardoso et al., "Jacobi Angles for Simultaneous Diagonaliation", Society for Industrial and Applied Mathematics, Jan. 1996.
András Gilyén et al., "Optimizing quantum optimization algorithms via faster quantum gradient computation", arXiv:1711.00465v3 [quant-ph], Apr. 2018.
Pranav Gokhale et al., "Minimizing State Preparations in Variational Quantum Eigensolver by Partitioning into Commuting Families", arXiv:1907.13623v1 [quant-ph], Jul. 2019.
Ikko Hamamura et al., "Efficient evaluation of quantum observables using entangled measurements", arXiv:1909.09119v2 [quant-ph], Dec. 2019.

(Continued)

*Primary Examiner* — Sun J Lin
(74) *Attorney, Agent, or Firm* — Tutunjian & Bitetto, P.C.; Keivan Razavi

(57) ABSTRACT

Methods and apparatuses for designing quantum circuits include obtaining Pauli strings included in a qubit Hamiltonian. At least some of the strings are grouped, based at least partially on a judgment of whether Pauli strings are observables that are jointly measurable by entangled measurement, at least at some operators. A quantum circuit is designed based on a result obtained from the grouping.

25 Claims, 11 Drawing Sheets

(56) References Cited

OTHER PUBLICATIONS

Abhinav Kandala et al., "Hardware-efficient Variational Quantum Eigensolver for Small Molecules and Quantum Magnets", arXiv:1704.05018v2 [quant-ph], Oct. 2017.
Jarrod R. McClean et al., "The theory of variational hybrid quantum-classical algorithms", New Journal of Physics, Feb. 2016.
Niikolaj Moll et al., "Quantum optimization using variational algorithms on near-term quantum devices", Quantum Science and Technology, Jun. 2018.
Alberto Peruzzo et al., "A variational eigenvalue solver on a photonic quantum processor", Nature Communications, Jul. 2014.
Vivek V. Shende et al., "Synthesis of Quantum-Logic Circuits", IEEE Transactions on Computer-Aided Design of Integrated Circuits and Systems, Jun. 2006.

* cited by examiner

GROUPING OF PAULI STRINGS USING ENTANGLED MEASUREMENTS

BACKGROUND

Technical Field

The present invention relates to grouping of Pauli strings using entangled measurements for designing a quantum circuit that enables quantum computing.

Description of the Related Art

Focus here is placed on a quantum computer, as a computing apparatus for which the calculation amount has significantly increased. For example, a VQE (Variational Quantum Eigensolver) is known as a hybrid algorithm of a quantum/classical computer that calculates eigenvalues in quantum chemistry.

A VQE calculates each expectation value of a Pauli string forming a qubit Hamiltonian. In order to improve the efficiency of the VQE, the processing of a plurality of types of Pauli matrices can be combined, on a tensor product basis (TPB). Furthermore, a quantum circuit can be designed based on the results of compiling Pauli matrices.

SUMMARY

A computer-implemented method, apparatus, and computer program product that further improves the efficiency of a VQE may be desired.

According to a first aspect of the present invention, provided is a computer-implemented method, comprising obtaining a plurality of Pauli strings included in a qubit Hamiltonian; grouping at least some of the plurality of Pauli strings, based at least partially on a judgment of whether a plurality of the Pauli strings are observables that are jointly measurable by entangled measurement, at least at some operators, and designing a quantum circuit based on a result obtained from the grouping. According to the present aspect, the processing of the VQE can be made more efficient by grouping the plurality of Pauli strings.

According to a second aspect of the present invention, in the first aspect, the plurality of Pauli strings include K-letter Pauli strings, the method further comprises generating a plurality of sets in which k-letter (where k is a natural number less than or equal to K) Pauli strings are elements, the number of elements in each set is $2^k$; and identifying sets that are observables jointly measurable by entangled measurement, from the plurality of generated sets, and the grouping includes performing grouping according to the sets identified by the identifying. According to the present aspect, it is possible to comprehensively prepare candidate Pauli strings that can be grouped in advance.

According to a third aspect of the present invention, in the first aspect or second aspect, the grouping includes generating a Pauli graph including each of the plurality of Pauli strings as a node; and generating a merged Pauli graph by merging at least some nodes in the Pauli graph, based on a judgment of whether Pauli strings corresponding to the at least some nodes among the plurality of Pauli strings are observables that are jointly measurable by entangled measurement, at least at some of the operators. According to the present aspect, the processing of the VQE can be made even more efficient by using the Pauli graph.

The summary clause does not necessarily describe all necessary features of the embodiments of the present invention. The present invention may also be a sub-combination of the features described above.

DETAILED DESCRIPTION

Hereinafter, some embodiments of the present invention will be described. The embodiments do not limit the invention according to the claims, and all the combinations of the features described in the embodiments are not necessarily essential to means provided by aspects of the invention.

Figure 1:
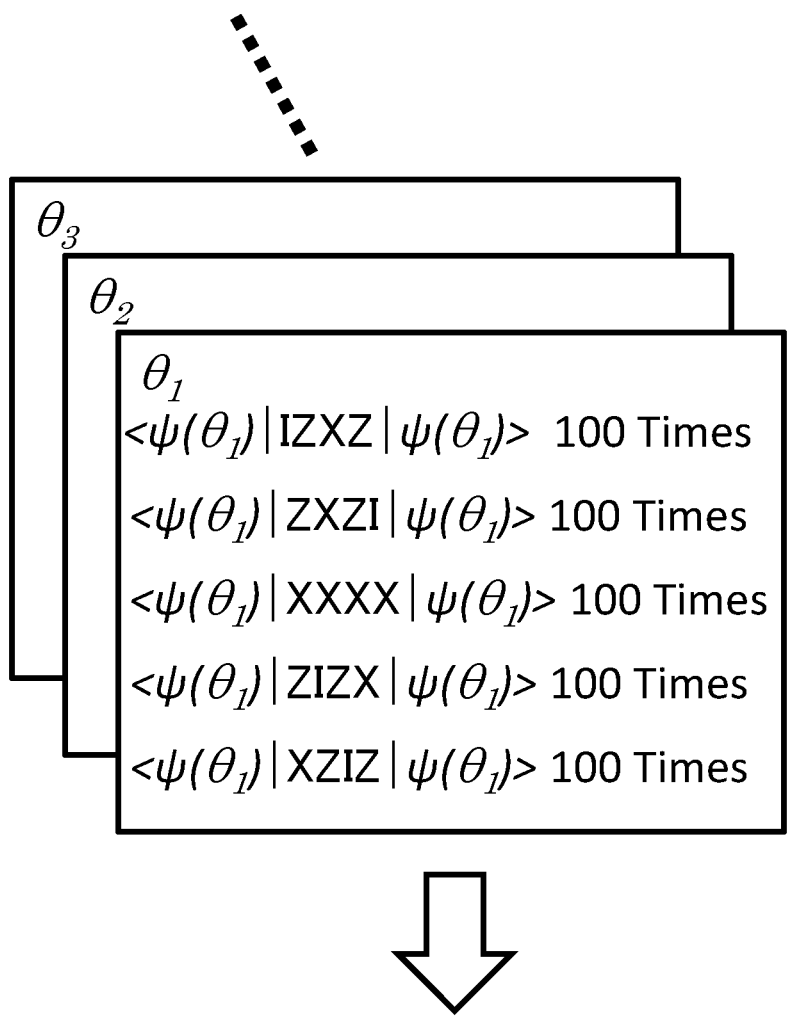
FIG. 1 shows an exemplary process of a VQE.

FIG. 1 shows an example of a calculation process of a VQE (Variational Quantum Eigensolver). The objective of the VQE is to calculate an eigenvalue and/or eigenvector of a qubit Hamiltonian in a Schrodinger equation. Therefore, the VQE identifies the θ that minimizes the expectation value $<\psi/(\theta)|H_q|\psi(\theta)>$ of a qubit Hamiltonian. In the following description, the term "quantum computer" also includes a classical quantum hybrid type of computer made by incorporating a quantum circuit in a classical computer.

For example, the VQE first calculates an expectation value $<\psi(\theta)|H_q|\psi(\theta)>$ for $\theta_1$, which is an initial θ. The qubit Hamiltonian $H_q$ is expressed as a linear combination of an identity operator I and a tensor product of Pauli operators ($\sigma_x$, $\sigma_y$, and $\sigma_z$). Such a tensor product is also referred to as a Pauli string.

Here, an example of a qubit Hamiltonian $H_q$ including a Pauli string IZXZ, a Pauli string ZXZI, a Pauli string XXXX, a Pauli string ZIZX, and a Pauli string IZXZ is used. In this example, the qubit Hamiltonian $H_q$ is expressed as shown below.

$$H_q = aIZXZ + bZXZI + cXXXX + dZIZX + eIZXZ \qquad \text{Expression 1}$$

Here, X, Y, and Z respectively represent the Pauli operators $\sigma_x$, $\sigma_y$, and $\sigma_z$, and "a" to "e" represent coefficients.

The VQE divides the expectation value $<\psi(\theta)|H_q|\psi(\theta)>$ into Pauli strings to perform the calculation. For example, in order to calculate the expectation value obtained from $\theta_1$, each of $<\psi(\theta_1)|IZXZ|\psi(\theta_1)>$, $<\psi(\theta_1)|ZXZI|\psi(\theta_1)>$, $<\psi(\theta_1)$ $|XXXX|\psi(\theta_1)>$, $<\psi(\theta_1)|ZIZX|\psi(\theta_1)>$, and $<\psi(\theta_1)|XZIZ|\psi(\theta_1)>$ is calculated, as shown in FIG. 1.

The calculation of $<\psi(\theta_1)|IZXZ|\psi(\theta_1)>$ is performed many times (e.g., 100 times) for $\theta_1$. The calculation of $<\psi(\theta_1)|IZXZ|\psi(\theta_1)>$ is performed by a quantum computer using quantum calculation, but the results of each trial are obtained stochastically. Therefore, by performing the calculation many times for the Pauli string IZXZ, the result of $<\psi(\theta_1)|IZXZ|\psi(\theta_1)>$ is obtained statistically.

In the example of FIG. 1, the quantum computer calculates five types of Pauli strings for $\theta_1$ 100 times each (i.e. a total of 500 calculations). Next, in a similar manner, the quantum calculation is performed many times for $\theta_2$, which is obtained by updating $\theta$, and an expectation value is calculated. Furthermore, $\theta$ is sequentially updated and corresponding expectation values are calculated. In this way, with the VQE, the minimum value of the expectation value $<\psi(\theta)|H_q|\psi(\theta)>$ is searched while updating $\theta$.

In other words, the VQE can be treated as performing a loop with a three-iteration structure. In the three-iteration structure, the first loop of the outermost iteration performs the update of $\theta$, the second loop of the middle iteration statistically calculates the expectation value for each Pauli string, and the third loop of the inner iteration performs quantum calculation of the Pauli strings one time each.

Figure 2:
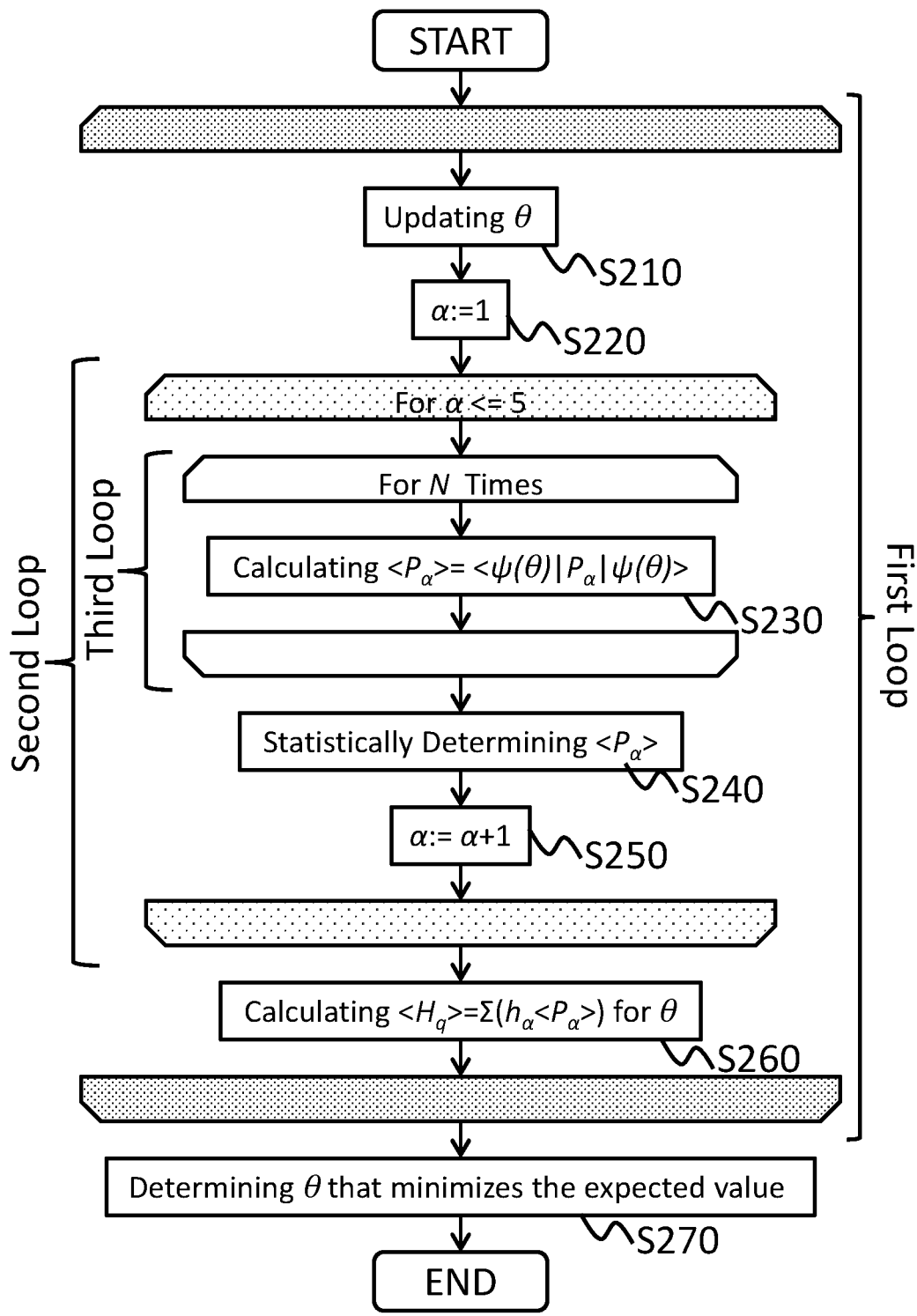
FIG. 2 shows an exemplary process flow of the VQE.

FIG. 2 shows the process flow of the VQE. The quantum computer may execute the VQE by performing the processes of S210 to S270 shown in FIG. 2. Here, S210 to S260 correspond to the first loop of the outermost iteration, S230 to S250 correspond to the second loop of the middle iteration, and S230 corresponds to the third loop of the inner iteration.

First, at S210, the quantum computer updates $\theta$. Here, $\theta$ may be a parameter identifying the wave function $\psi$. For example, $\theta$ includes one or more types of functions contained in $\psi$, a coefficient of each function, and values designating adjustment terms or the like. As an example, $\theta$ may be a vector including integers and/or real numbers.

At the first performance of S210, the quantum computer may set the designated $\theta$, or $\theta$ may be determined randomly. At the second and following performances of S210, the quantum computer may set a $\theta$ for which reduction of the expectation value is predicted, based on a known algorithm such as derivative-free optimization methods.

At S220, the quantum computer initializes $\alpha$. Here, $\alpha$ may be a variable designating the Pauli string $P_\alpha$. For example, the Pauli string $P_1$ corresponding to the time when $\alpha=1$ may be IZXZ, and the Pauli strings $P_2$ to $P_5$ respectively corresponding to the times when $\alpha=2$ to $\alpha=5$ may be ZXZI, XXXX, ZIZX, and XZIZ.

Next, at S230, the quantum computer performs a quantum calculation of the Pauli string corresponding to $\alpha$. For example, the quantum computer performs the quantum calculation of the expectation value $<P_\alpha>=<\psi(\theta)|P_\alpha|\psi(\theta)>$ one time. As an example, when $\alpha=1$ at step S230, the quantum computer performs the calculation of $<\psi(\theta)|IZXZ|\psi(\theta)>$ one time. The quantum computer performs the quantum calculation of S230 a predetermined number N of times (e.g., 100 times) in the third loop.

After the process of the third loop, at S240, the quantum computer statistically determines the expectation value of the Pauli string corresponding to $\alpha$. For example, when $\alpha=1$, the quantum computer calculates a statistical quantity (e.g., an average value, a median value, or a most numerous numerical value) of N calculation results of $<\psi(\theta)|IZXZ|\psi(\theta)>$, and outputs the result as the calculation result of the expectation value $<P_\alpha>$.

Next, at S250, the quantum computer updates $\alpha$. For example, the quantum computer adds 1 to $\alpha$. After this, if $\alpha$ is less than or equal to a predetermined number (e.g., 5), the quantum computer again performs the process of the third loop, and if $\alpha$ is not less than or equal to the predetermined number, the quantum computer may end the process of the second loop and perform the process of S260.

At S260, the quantum computer calculates the expectation value of the qubit Hamiltonian for the current $\theta$. For example, the quantum computer calculates the expectation value $<H_q>$ using $\Sigma(h_\alpha <P_\alpha>)$. Here, $h_\alpha$ may be a coefficient for each Pauli string, and corresponds to "a" to "e" in Expression 1, for example. After this, if an end condition (e.g., the ending of the update of $\theta$ a prescribed number of times, no further improvement of the expectation value $<H_q>$ being realized, or the like) is satisfied, the quantum computer performs the process of S270, and if this end condition is not satisfied, the quantum computer returns to the process of S210.

At S270, the quantum computer determines the minimum expectation value $<H_q>$ and the $\theta$ that yields this minimum expectation value $<H_q>$, and outputs these values.

In this way, with the VQE, the minimum expectation value $<H_q>$ is determined by performing the process of the three iterations in the first to third loops. Here, if a plurality of Pauli strings are processed together, the processes of the second loop can be made more efficient.

Therefore, the apparatus in embodiments of the present invention uses observables that are jointly measurable by entangled measurement, to improve the efficiency of the processes of the second loop of the VQE.

Figure 3:
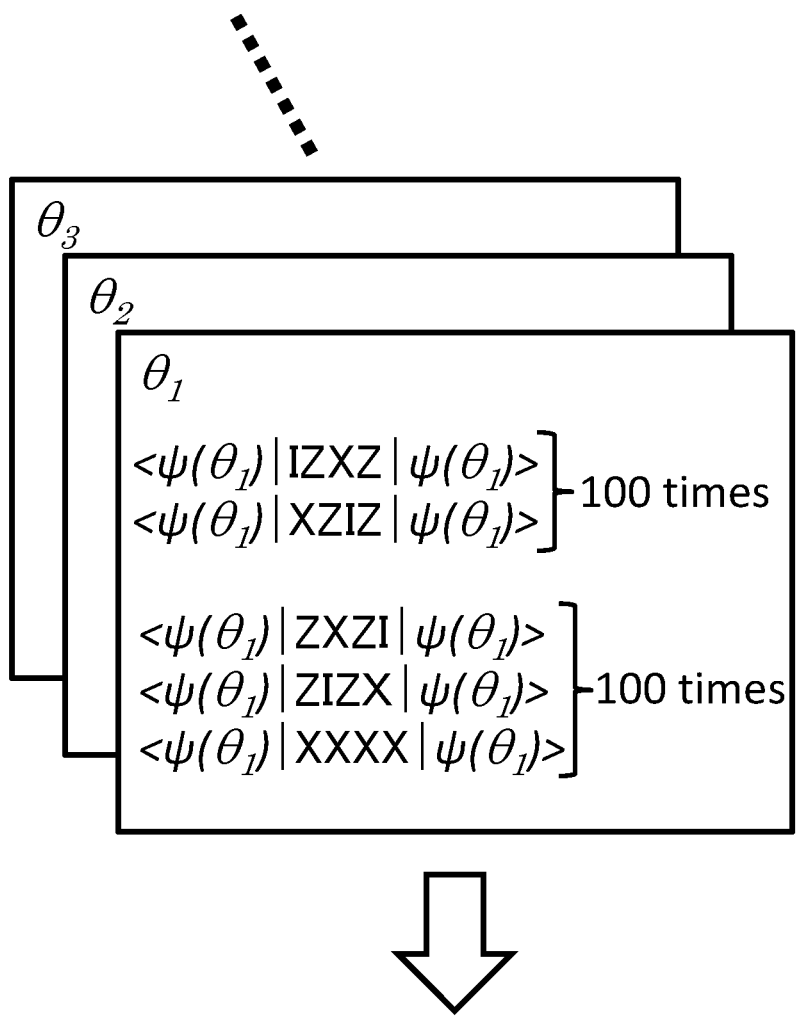
FIG. 3 shows an exemplary process of the VQE that has been made more efficient in the present embodiment.

FIG. 3 shows exemplary processing of the VQE that has been made more efficient, according to the present embodiment. In the example of FIG. 3, the quantum computer performs the calculations of two types of Pauli strings 100 times each (i.e. a total of 200 times) for $\theta_1$. Here, in the present example, the quantum calculation of IZXZ and the quantum calculation of XZIZ are performed jointly. Furthermore, the quantum calculation of ZXZI, the quantum calculation of XXXX, and the quantum calculation of ZIZX are performed jointly.

In this way, according to the present example, the number of quantum calculations per $\theta$ can be reduced to ⅖ compared to the example shown in FIG. 1, and the number of the quantum circuit can be reduced. The following describes a specific realization method.

Figure 4:
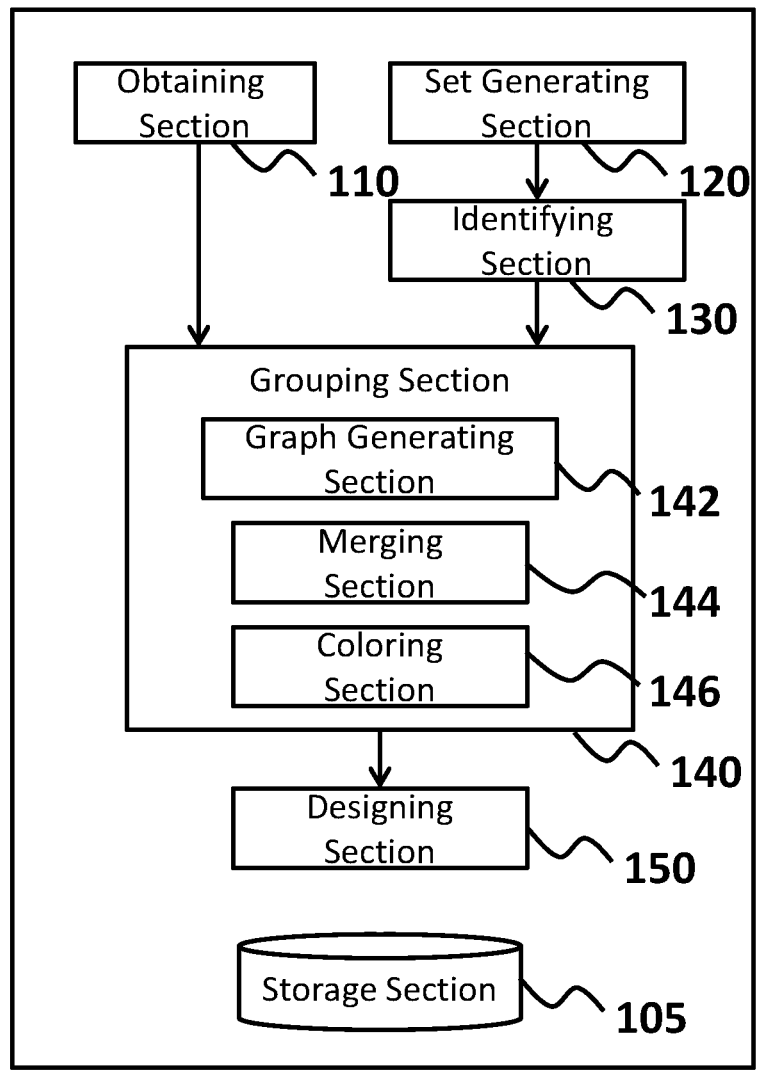
FIG. 4 shows an exemplary apparatus 10 in the present embodiment.

FIG. 4 shows a block diagram of an apparatus 10 according to the present embodiment. The apparatus 10 is an information processing apparatus (e.g., a computer) that realizes a VQE with improved efficiency by grouping Pauli strings that are jointly processable. Specifically, the apparatus 10 uses observables that are jointly measurable by entangled measurement to group the Pauli strings. The apparatus 10 includes a storage section 105, an obtaining section 110, a set generating section 120, an identifying section 130, a grouping section 140, and a designing section 150.

The storage section 105 stores information used in the processing of the apparatus 10. For example, the storage section 105 stores various types of data/instructions used in the operation of the apparatus 10. One or more elements (e.g., the obtaining section 110, the set generating section 120, the identifying section 130, the grouping section 140, and the designing section 150) of the apparatus 10 may communicate data directly or via the storage section 105, as necessary.

The obtaining section 110 obtains a plurality of Pauli strings included in the qubit Hamiltonian $H_q$. For example, the obtaining section 110 obtains the Pauli strings IZXZ, ZXZI, XXXX, ZIZX, and XZIZ included in the qubit Hamiltonian shown in Expression 1.

set generating section 120 generates a plurality of sets including a plurality of Pauli strings. For example, when the number of letters of the Pauli strings obtained by the obtaining section 110 is K letters (e.g., K=4), the set generating section 120 generates a plurality of sets in which k-letter (where k is a natural number less than or equal to K) Pauli strings are the elements of each set. Details of the set generation by the set generating section 120 are described further below.

The identifying section 130 identifies sets that are observable jointly measurable using entangled measurement, from the plurality of sets generated by the set generating section 120. The entangled measurement may be a Bell measurement, for example Details of the identification by the identifying section 130 are described further below.

The grouping section 140 groups at least some of the plurality of Pauli strings included in the qubit Hamiltonian. For example, the grouping section 140 performs the grouping using the sets identified by the identifying section 130. In this way, the grouping section 140 performs the grouping based at least partially on the judgment of whether a plurality of Pauli strings are observables that are jointly measurable by entangled measurement. The grouping section 140 includes a graph generating section 142, a merging section 144, and a coloring section 146.

The graph generating section 142 generates a Pauli graph including, as nodes, each of the plurality of Pauli strings included in the qubit Hamiltonian obtained by the obtaining section 110. The Pauli graph is a graph in which each of the Pauli strings in the qubit Hamiltonian is a node. Details of the Pauli graph generation are described further below.

The merging section 144 merges at least some nodes in the Pauli graph, to generate a merged Pauli graph. For example, the merging section 144 may perform the merging of the nodes based on a judgment of whether Pauli strings corresponding to nodes to be merged among the plurality of Pauli strings are observables that are jointly measurable by entangled measurement. The merging section 144 may perform the judgment of whether Pauli strings are observables that are jointly measurable by entangled measurement using the sets identified by the identifying section 130.

The coloring section 146 separate the nodes included in the merged Pauli graph into groups such that nodes not connected with edges are associated with the same group. For example, the coloring section 146 performs the separation into groups by applying a coloring algorithm to the merged Pauli graph. As a result, the coloring section 146 generates groups that include two or more Pauli strings. In this way, the coloring section 146 groups at least some of the plurality of Pauli strings included in the qubit Hamiltonian.

The designing section 150 designs the quantum circuit based on the results of the grouping by the grouping section 140. For example, the designing section 150 designs the quantum circuit such that calculations of Pauli strings in a same group made by the grouping section 140 are shared in the quantum circuit. Thereby the calculations of the expectation values $<P_\alpha>$ for Pauli strings in the same group can be performed jointly by the VQE. Details about the designing of the quantum circuit are described further below.

In this way, according to the apparatus 10, the plurality of Pauli strings are grouped based at least partially on the judgment of whether the Pauli strings are observables that are jointly measurable using entangled measurement. Due to this grouping, according to the apparatus 10, it is possible to improve the efficiency of the processing of the second loop by the VQE.

The apparatus 10 may include a processor or programmable circuitry. For example, the storage section 105 may be one or more computer readable mediums collectively storing instructions or a computer program that contains instructions. The instructions, when executed by a processor or programmable circuitry, cause the processor or programmable circuitry to perform the operations of at least some of the obtaining section 110, the set generating section 120, the identifying section 130, the grouping section 140, and the designing section 150.

Figure 5:
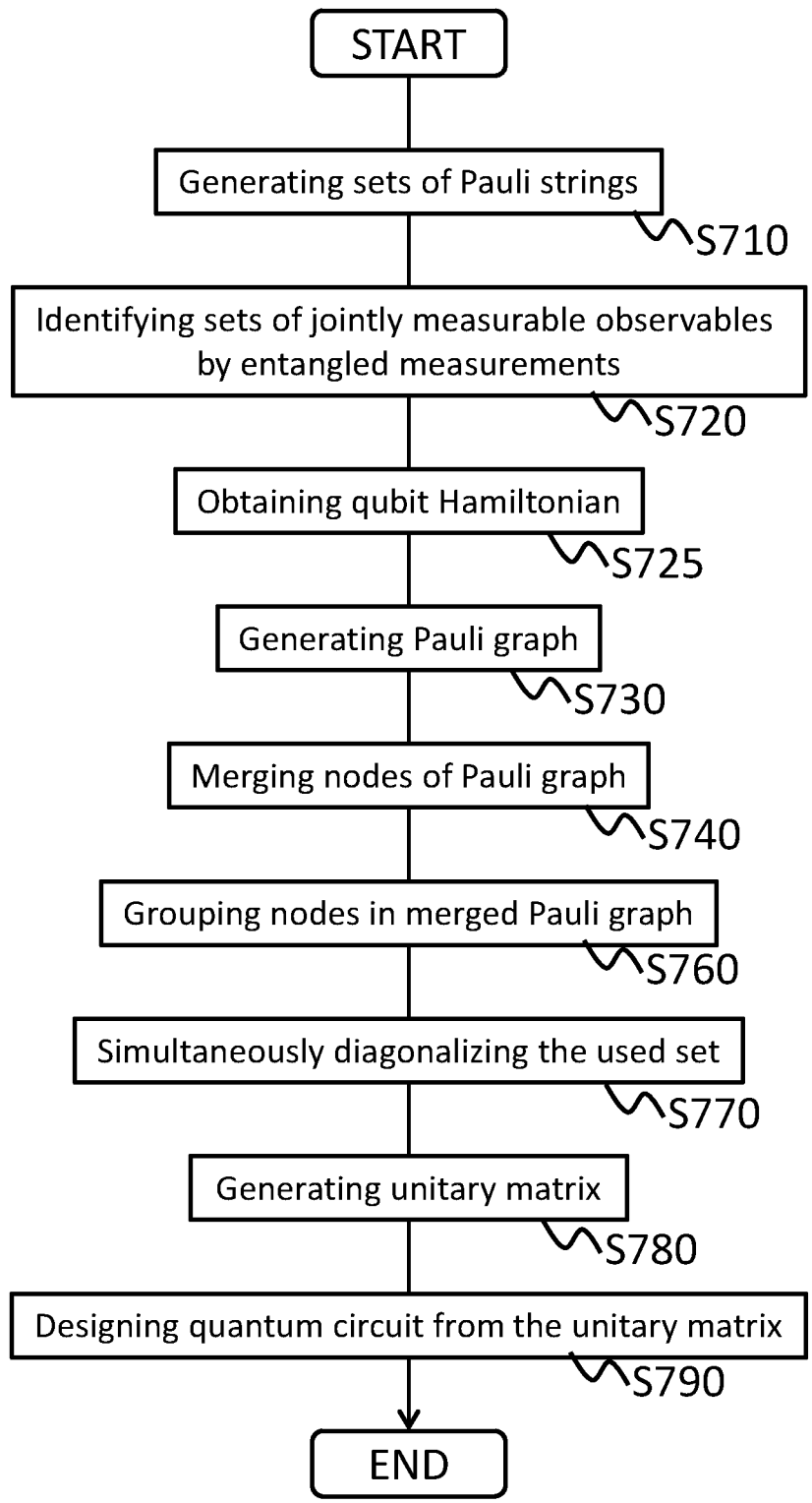
FIG. 5 shows an exemplary process flow of the apparatus 10 of the present embodiment.

FIG. 5 shows an exemplary process flow of the apparatus 10 according to the present embodiment. In the present embodiment, the apparatus 10 improves the efficiency of the VQE by grouping Pauli strings included in a qubit Hamiltonian, by performing the processes of S710 to S790.

At S710, the set generating section 120 generates a set including a plurality of Pauli strings. For example, if the qubit Hamiltonian obtained at S725 includes K-letter Pauli strings, the set generating section 120 generates a plurality of sets of k-letter Pauli strings, where k is less than or equal to K. The set generating section 120 generates the sets such that the number of elements is $2^k$. Here, the set generating section 120 generates a set including Pauli strings (e.g., II, III, IIII) of only the identity operator I in the elements.

The set generating section 120 may generate all of the sets that satisfy the above conditions (i.e. sets including k-letter Pauli strings as elements in which the number of elements is $2^k$ and a Pauli string of I only is included as one element). Instead, the set generating section 120 may generate only some of the sets that satisfy the above conditions. The set generating section 120 may generate sets for some or all k values satisfying 1<k≤K.

Specifically, the set generating section 120 first enumerates the Pauli strings in which k Pauli operators of A types are arranged, in all ways (i.e. $A^k$ ways). As an example, if k=2 and the Puli operators are I, X, Y, Z (i.e. A=4), the set generating section 120 can enumerate II, IX, IY, IZ, XI, XX, XY, YZ, YI, YX, YY, YZ, ZI, ZX, ZY, and ZZ.

After this, the set generating section 120 generates a set including $2^k$ of these enumerated Pauli strings. It should be noted that the set generating section 120 causes each set to include a Pauli string (e.g., II) that includes only k identity operators. As an example, for k=2, the set generating section 120 generates a set (II, IX, IY, IZ), a set (II, IX, IY, XI), a set (II, IX, IY, XX), . . . , and a set (II, ZX, ZY, ZZ) each including four elements.

Next, at step S720, the identifying section 130 identifies sets that are observables jointly measurable using entangled measurement, from the plurality of sets generated by the set generating section 120 at S710. For example, if the Pauli string $P_1$ and the Pauli string $P_2$ are commutative, the identifying section 130 may identify $P_1$ and $P_2$ as being observables that are jointly measurable by entangled measurement. If the Pauli string $P_1$ and the Pauli string $P_2$ satisfy $P_1P_2-P_2P_1=0$, then the Pauli string $P_1$ i and the Pauli string $P_2$ are commutative.

Specific examples of the entangled measurement include a Bell measurement, an omega measurement, a sigma measurement, and a xi measurement. Here, the omega measurement is a measurement utilizing an omega state shown in Expression 4 below, the sigma measurement is a measurement utilizing a sigma state shown in Expression 6 below, and the xi measurement is a measurement utilizing a xi state shown in Expression 8 below.

For example, in a Bell measurement, the Pauli string XX, the Pauli string II, the Pauli string YY, and the Pauli string ZZ are all commutative. Therefore, the identifying section 130 identifies (II, XX, YY, ZZ) among the k=2 sets enumerated at S710, for example, as observables that are jointly measurable using Bell measurement. Similarly, the identifying section 130 may identify (II, ZZ, XY, YX), (II, XX, YZ, ZY), (II, YY, XZ, ZX), (II, XX, YZ, ZY), and the like as observables that are jointly measurable using entanglement measurements such as the omega measurement, the sigma measurement, and the xi measurement in addition to Bell measurement.

The identifying section 130 may identify sets for all or some of the k values satisfying 1<k≤K. For example, in a similar manner to when k=2, the identifying section 130 may identify (III, XXX, IZZ, ZIZ, ZZI, XYY, YXY, YYX) and the like for k=3 and identify (IIII, XXXX, IXXZ, ZXZI, ZIZX, XZIZ, XYIY, YIYX, YXYI, IYXY, ZYYZ, ZZYY, XIXI, XIXI, YYZZ, YZZY) and the like for k=4.

At S725, the obtaining section 110 obtains the qubit Hamiltonian $H_q$. For example, the obtaining section 110 obtains a plurality of Pauli strings included in the qubit Hamiltonian $H_q$. Each of the plurality of Pauli strings includes one or more of operators such as I, X, Y, or Z.

Figure 6:
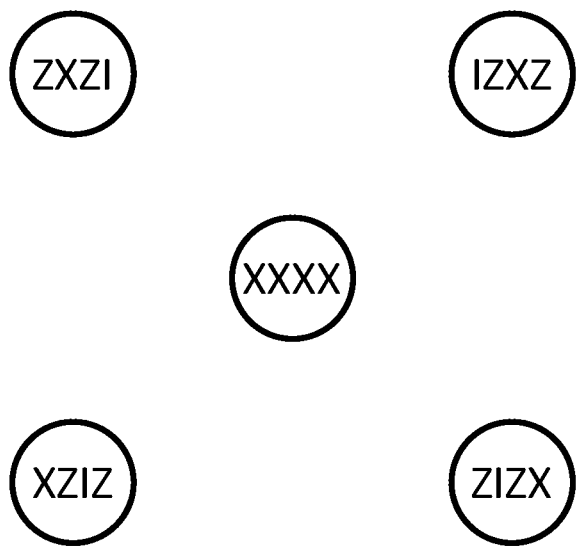
FIG. 6 shows an example of a plurality of Pauli strings included in a qubit Hamiltonian.

FIG. 6 shows an example of a plurality of Pauli strings included in the qubit Hamiltonian. For example, as shown in the drawing, the obtaining section 110 may obtain ZXZI, IZXZ, XXXX, XZIZ, and ZIZX as the plurality of Pauli strings included in the qubit Hamiltonian.

At S730, the graph generating section 142 generates the Pauli graph. For example, the graph generating section 142 generates the Pauli graph including each of the plurality of Pauli strings included in the qubit Hamiltonian obtained at S725 as a node.

Figure 7:
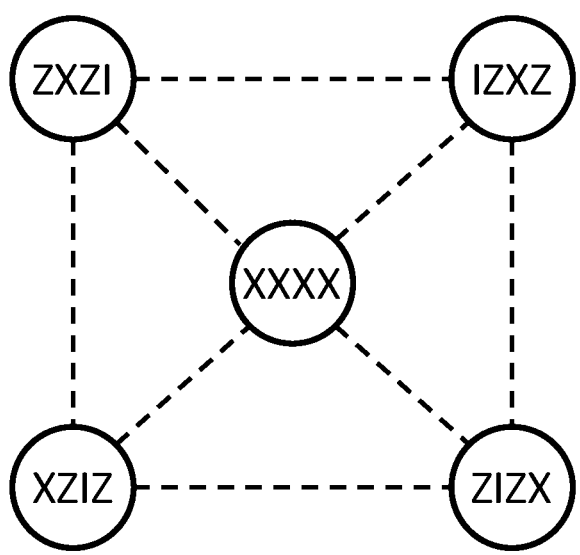
FIG. 7 shows an exemplary Pauli graph.

FIG. 7 shows an exemplary Pauli graph. The graph generating section 142 may generate the Pauli graph shown in FIG. 7 from the plurality of Pauli strings shown in FIG. 6. If the operators in the corresponding position are the same (e.g., X and X in the 1$^{st}$ operator of two Pauli strings, Y and Y in the 2nd operator of two Pauli strings, or Z and Z in the 3$^{rd}$ operator of two Pauli strings) or if at least one of the operators being compared is I (e.g., I and X), the graph generating section 142 may judge these to be observables that are jointly measurable on the tensor product basis, at the operators being compared. In an embodiment, the graph generating section 142 may determine that Pauli strings are jointly measurable by TPB when all operators in the Pauli strings are jointly measurable observables in each corresponding position.

For example, ZXZI and IZXZ are observables that are jointly measurable on the tensor product basis at the first operator (Z, I) and the fourth operator (I, Z), but are not observables that are jointly measurable on the tensor product basis at the second operator (X, Z) and the third operator (Z, X). The graph generating section 142 may connect Pauli strings when the Pauli strings are NOT jointly measurable by TPB. Accordingly, the graph generating section 142 may connect ZXZI and IZXZ with an edge.

On the other hand, for example, ZXZI and ZIZX are observables that are jointly measurable on the tensor product basis at all of the first operator (Z, Z), the second operator (X, I), the third operator (Z, Z), and the fourth operator (I, X). The graph generating section 142 may not connect Pauli strings when the Pauli strings are jointly measurable by TPB. Accordingly, the graph generating section 142 does not need to connect ZXZI and ZIZX with an edge.

As explained, if the first Pauli string and the second Pauli string included in the plurality of Pauli strings are not observables that are jointly measurable on a tensor product basis at least at one of the operators, the graph generating section 142 generates the graph by connecting the first Pauli string and the second Pauli string with an edge. The graph generating section 142 may generate the Pauli graph based on all of the operators included in the plurality of Pauli strings.

Next, at S740, the merging section 144 merges at least some nodes in the Pauli graph generated at S730, to generate the merged Pauli graph. For example, the merging section 144 may merge the nodes based on the judgment of whether the Pauli strings corresponding to nodes to be merged are observables that are jointly measurable using entangled measurement, at least at some of the operators.

As an example, if at least some of the Pauli strings are observables that are jointly measurable using entangled measurement at some of the operators and are observables that are jointly measurable on the tensor product basis at the remaining operators, the merging section 144 may merge the nodes corresponding to at least the some of the Pauli strings. Here, the some of the operators and the remaining operators may be consecutive operators or separate operators. For example the some of the operators may be a first operator and a third operator, and the remaining operators may be a second operator and a fourth operator in 4-letter Pauli string.

Figure 8:
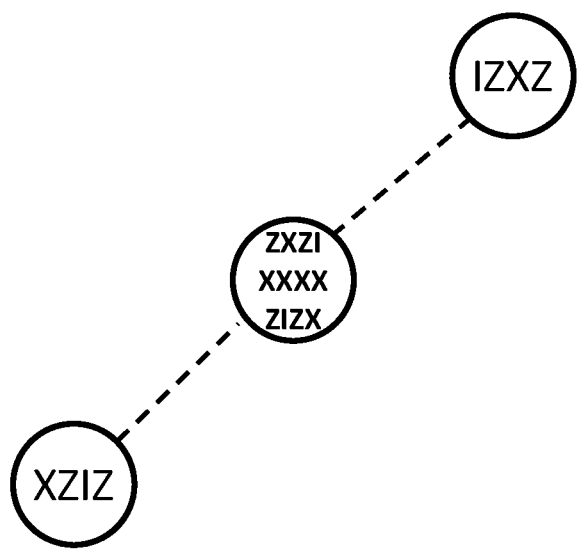
FIG. 8 shows an exemplary merged Pauli graph.

FIG. 8 shows an exemplary merged Pauli graph. The merging section 144 may generate the merged Pauli graph shown in FIG. 8 from the Pauli graph shown in FIG. 7. If the some of the operators being compared are included in the same one of the plurality of sets generated at S720, the merging section 144 may judge that the operators being compared are observables that are jointly measurable using entangled measurement. Please note that the operators being compared are respectively prepared by merging some operators at arbitrary positions in a Pauli string. Hereinafter, the same one of the plurality of sets that includes the some of the operators may be referred to as "target set." Furthermore, the merging section 144 may perform a judgment of whether the remaining operators are observables that are jointly measurable on the tensor product basis in a same manner as a method used when generating the Pauli graph of S730.

For example, the merging of the first operators and the third operators of ZXZI, XXXX, and ZIZX results in ZZ, XX, and ZZ, and these merged results are included jointly in one set (II, XX, YY, ZZ) generated at S720. Furthermore, ZXZI, XXXX, and ZIZX are observables that are jointly measurable on the tensor product basis, at the second letters and fourth letters (XI, XX, IX).

Accordingly, the merging section 144 may merge the three nodes corresponding to ZXZI, XXXX, and ZIZX. As a result, the merged Pauli graph includes a node corresponding to XZIZ, a merged node corresponding to ZXZI, XXXX, and ZIZX, and a node corresponding to IZXZ.

A case can also be imagined in which, at a plurality of nodes that are merging targets of the Pauli graph, there are different edge connection states with other nodes (e.g., a case in which ZXZI is connected to IZXZ, but XXXX and IZXZ are not connected or the like). In such a case, the merging section 144 may provide a connection between the merged node and the other node.

Next, at S760, the coloring section 146 separates the nodes included in the merged Pauli graph into groups, such that nodes connected to each other by an edge are associated with different groups and nodes not connected to each other by an edge may be associated with the same group. Furthermore, the coloring section 146 may associate a plurality of Pauli strings included in the merged nodes with the same group.

The coloring section 146 may perform the separation into groups in a manner to minimize the number of generated groups. For example, the coloring section 146 may implement a coloring algorithm that exactly or approximately solves a graph coloring problem. In this way, the coloring section 146 performs the separation into groups by applying the coloring algorithm to the merged Pauli graph.

Figure 9:
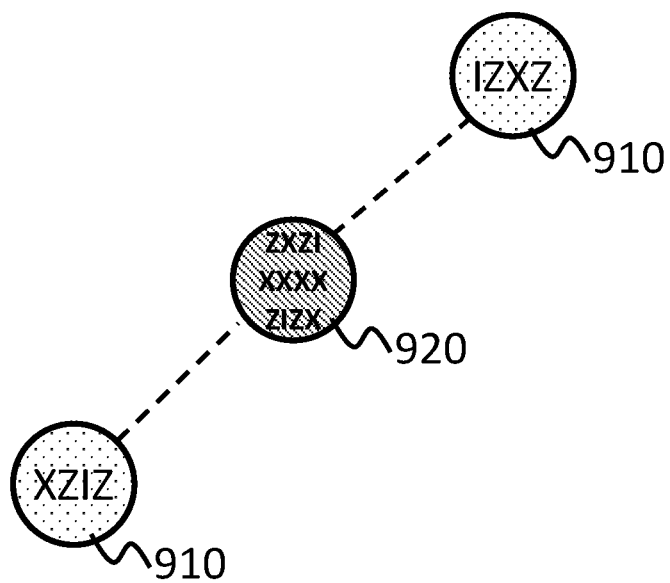
FIG. 9 shows an exemplary merged Pauli graph in which separation into groups has been performed.

FIG. 9 shows an exemplary merged Pauli graph in which the separation into groups has been performed. The coloring section 146 may perform the separation into groups shown in FIG. 9, from the merged Pauli graph shown in FIG. 8. For example, in the merged Pauli graph, IZXZ and XZIZ are not connected by an edge. Furthermore, ZXZI, XXXX, and ZIZX are included in a single node. In this way, the coloring section 146 may generate a first group 910 including IZXZ and XZIZ and a second group 920 including ZXZI, XXXX, and ZIZX.

Figure 10:
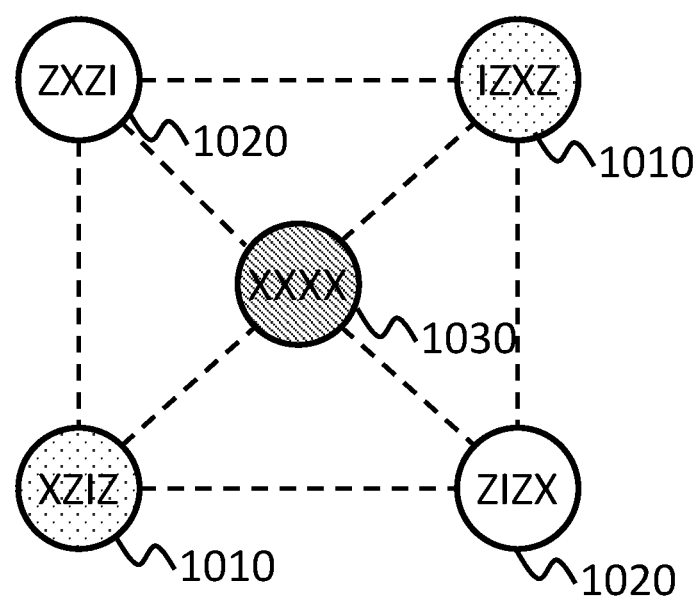
FIG. 10 shows an exemplary result of separation into groups performed based on only a Pauli graph.

FIG. 10 shows the result of the separation into groups performed based only on the Pauli graph. If a plurality of Pauli strings are grouped based only on the Pauli graph, without merging the nodes of the Pauli graph, there are cases where the number of generated groups becomes large.

For example, if the Pauli graph shown in FIG. 7 is separated into groups according to the coloring algorithm, as shown in FIG. 10, the coloring section 146 generates a first group 1010 including IZXZ and XZIZ, a second group 1020 including ZXZI and ZIZX, and a third group 1030 including XXXX.

As a result, the processing amount of the second loop of the VQE becomes 3/5 compared to before the separation into groups, and it is possible to improve the efficiency by a certain degree. However, in this case, the processing amount of the second loop is 3/2 compared to the case of the separation into groups shown in FIG. 9. Accordingly, with the present embodiment, it is possible to further improve the efficiency of the VQE by using the determination of whether Pauli strings are observables that are jointly measurable by entangled measurement.

Next, at S770, the designing section 150 simultaneously diagonalizes the target sets used in the merging of the nodes of S740. For example, if a target set (II, XX, YY, ZZ) is used at S740, the designing section 150 simultaneously diagonalizes the Pauli strings of the target set (II, XX, YY, ZZ).

Here, the target set (II, XX, YY, ZZ) is an observable that is jointly measurable by a Bell measurement, and therefore the designing section 150 diagonalizes the Pauli strings of this set based on the Bell state shown below.

$$|\Phi^\pm\rangle = \frac{1}{\sqrt{2}}|00\rangle \pm \frac{1}{\sqrt{2}}|11\rangle \quad \text{(Expression 2)}$$

$$|\Psi^\pm\rangle = \frac{1}{\sqrt{2}}|01\rangle \pm \frac{1}{\sqrt{2}}|10\rangle$$

The result of the diagonalization is as shown below.

$$XX = (|\Phi^+\rangle\langle\Phi^+| + |\Psi^+\rangle\langle\Psi^+|) - (|\Phi^-\rangle\langle\Phi^-| + |\Psi^-\rangle\langle\Psi^-|)$$

$$YY = (|\Psi^+\rangle\langle\Psi^+| + |\Phi^+\rangle\langle\Phi^+|) - (|\Phi^-\rangle\langle\Phi^-| + |\Psi^-\rangle\langle\Psi^-|)$$

$$ZZ = (|\Phi^+\rangle\langle\Phi^+| + |\Phi^+\rangle\langle\Phi^+|) - (|\Psi^-\rangle\langle\Psi^-| + |\Psi^-\rangle\langle\Psi^-|)$$

$$II = (|\Phi^+\rangle\langle\Phi^+| + |\Phi^+\rangle\langle\Phi^+|) - (|\Psi^-\rangle\langle\Psi^-| + |\Psi^-\rangle\langle\Psi^-|) \quad \text{(Expression 3)}$$

Here, when the target set is an observable that is jointly measurable by an omega measurement, the designing section 150 may diagonalize the Pauli strings of this set based on the omega state, instead of on the Bell state. For example, the designing section 150 may diagonalize the Pauli strings of the set (II, YY, XZ, ZX) based on the omega state shown below.

$$|\Omega_0\rangle = \tfrac{1}{2}|00\rangle + \tfrac{1}{2}|01\rangle - \tfrac{1}{2}|10\rangle + \tfrac{1}{2}|11\rangle$$

$$|\Omega_1\rangle = -\tfrac{1}{2}|00\rangle + \tfrac{1}{2}|01\rangle + \tfrac{1}{2}|10\rangle + \tfrac{1}{2}|11\rangle$$

$$|\Omega_2\rangle = \tfrac{1}{2}|00\rangle + \tfrac{1}{2}|01\rangle + \tfrac{1}{2}|10\rangle - \tfrac{1}{2}|11\rangle$$

$$|\Omega_3\rangle = \tfrac{1}{2}|00\rangle - \tfrac{1}{2}|01\rangle + \tfrac{1}{2}|10\rangle + \tfrac{1}{2}|11\rangle \quad \text{(Expression 4)}$$

The result of the diagonalization is as shown below.

$$YY = |\Omega_1\rangle\langle\Omega_1| + |\Omega_2\rangle\langle\Omega_2| - |\Omega_0\rangle\langle\Omega_0| - |\Omega_3\rangle\langle\Omega_3|$$

$$XZ = |\Omega_2\rangle\langle\Omega_2| + |\Omega_3\rangle\langle\Omega_3| - |\Omega_0\rangle\langle\Omega_0| - |\Omega_1\rangle\langle\Omega_1|$$

$$ZX = |\Omega_0\rangle\langle\Omega_0| + |\Omega_2\rangle\langle\Omega_2| - |\Omega_1\rangle\langle\Omega_1| - |\Omega_3\rangle\langle\Omega_3| \quad \text{Expression 5)}$$

Furthermore, the designing section 150 may diagonalize the Pauli strings of the set based on the sigma state, instead of on the Bell state. When the target set is an observable that is jointly measurable by a sigma measurement, the designing section 150 may diagonalize the Pauli strings of this set based on the sigma state, instead of on the Bell state. For example, the designing section 150 may diagonalize the Pauli strings of the set (II, ZZ, XY, YX) based on the sigma state shown below.

$$|\Sigma_0\rangle = \frac{1}{\sqrt{2}}|01\rangle - i\frac{1}{\sqrt{2}}|10\rangle \quad \text{(Expression 6)}$$

$$|\Sigma_1\rangle = \frac{1}{\sqrt{2}}|01\rangle + i\frac{1}{\sqrt{2}}|10\rangle$$

$$|\Sigma_2\rangle = \frac{1}{\sqrt{2}}|00\rangle - i\frac{1}{\sqrt{2}}|11\rangle$$

$$|\Sigma_3\rangle = \frac{1}{\sqrt{2}}|00\rangle + i\frac{1}{\sqrt{2}}|11\rangle$$

The result of the diagonalization is as shown below.

$$ZZ = |\Sigma_2\rangle\langle\Sigma_2| + |\Sigma_3\rangle\langle\Sigma_3| - |\Sigma_0\rangle\langle\Sigma_0| - |\Sigma_1\rangle\langle\Sigma_1|$$

$$XY = |\Sigma_0\rangle\langle\Sigma_0| + |\Sigma_3\rangle\langle\Sigma_3| - |\Sigma_1\rangle\langle\Sigma_1| - |\Sigma_2\rangle\langle\Sigma_2|$$

$$YX = |\Sigma_1\rangle\langle\Sigma_1| + |\Sigma_3\rangle\langle\Sigma_3| - |\Sigma_0\rangle\langle\Sigma_0| - |\Sigma_2\rangle\langle\Sigma_2| \quad \text{(Expression 7)}$$

Furthermore, the designing section 150 may diagonalize the Pauli strings of the set based on the xi state, instead of on the Bell state. When the target set is an observable that is jointly measurable by a xi measurement, the designing section 150 may diagonalize the Pauli strings of this set based on the xi state, instead of on the Bell state. For example, the designing section 150 may diagonalize the Pauli strings of the set (II, ZZ, XY, YX) based on the xi state shown below.

$$|\Xi_0\rangle = \frac{1}{2}|00\rangle - \frac{i}{2}|01\rangle + \frac{i}{2}|10\rangle - \frac{1}{2}|11\rangle \quad \text{(Expression 8)}$$

$$|\Xi_1\rangle = -\frac{1}{2}|00\rangle - \frac{i}{2}|01\rangle - \frac{i}{2}|10\rangle - \frac{1}{2}|11\rangle$$

-continued $$|\Xi_2\rangle = \frac{1}{2}|00\rangle - \frac{i}{2}|01\rangle - \frac{i}{2}|10\rangle + \frac{1}{2}|11\rangle$$

$$|\Xi_3\rangle = \frac{1}{2}|00\rangle + \frac{i}{2}|01\rangle - \frac{i}{2}|10\rangle - \frac{1}{2}|11\rangle.$$

The result of the diagonalization is as shown below.

$$ZZ=|\Xi_2\rangle\langle\Xi_2|+|\Xi_3\rangle\langle\Xi_3|-|\Xi_0\rangle\langle\Xi_0|-|\Xi_1\rangle\langle\Xi_1|$$

$$XY=|\Xi_0\rangle\langle\Xi_0|+|\Xi_3\rangle\langle\Xi_3|-|\Xi_1\rangle\langle\Xi_1|-|\Xi_2\rangle\langle\Xi_2|$$

$$YX=|\Xi_1\rangle\langle\Xi_1|+|\Xi_3\rangle\langle\Xi_3|-|\Xi_0\rangle\langle\Xi_0|-|\Xi_2\rangle\langle\Xi_2|  \quad \text{(Expression 9)}$$

Next, at S780, the designing section 150 generates a unitary matrix on the basis of the diagonalization obtained at S770. For example, the unitary matrix obtained from Expression 3 is as shown below.

$$|\Phi^+\rangle\langle 00|+|\Phi^-\rangle\langle 01|+|\Psi^+\rangle\langle 10|+|\Psi^-\rangle\langle 11| \quad \text{(Expression 6)}$$

Next, at S790, the designing section 150 designs the quantum circuit from the result of the separation into groups of S760 and the unitary matrix obtained at S780. Here, an example of the quantum circuit generated by the designing section 150 is described using FIG. 11 to FIG. 14.

Figure 11:
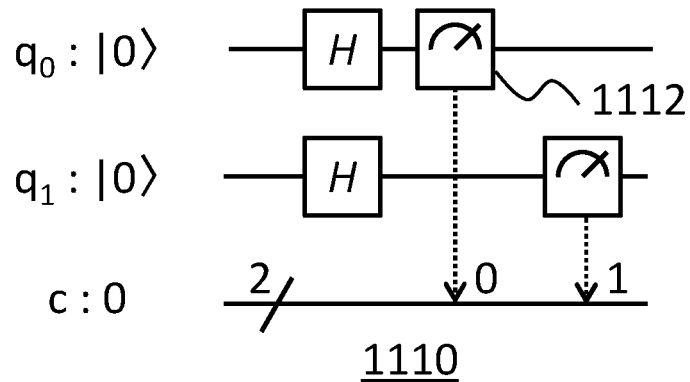
FIG. 11 shows an exemplary quantum circuit corresponding to the Pauli string XX.
Figure 12:
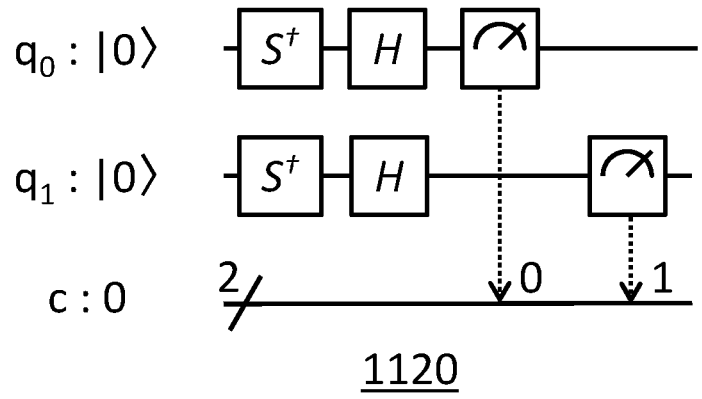
FIG. 12 shows an exemplary quantum circuit corresponding to the Pauli string YY.
Figure 13:
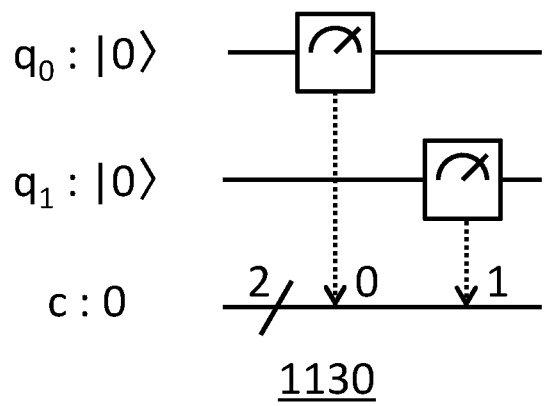
FIG. 13 shows an exemplary quantum circuit corresponding to the Pauli string ZZ.

FIG. 11 shows an exemplary quantum circuit 1110 corresponding to the Pauli strings XX, IX and XI. In the drawing, |0⟩ indicates a quantum state, H indicates a quantum gate called Hadamard gate, a symbol shown by 1112 indicates measurement, $q_0$ indicates the quantum bit of the first bit, $q_1$ indicates the quantum bit of the second bit, and c indicates the classical bits of the output with size 2. Similarly, FIG. 12 shows an exemplary quantum circuit 1120 corresponding to the Pauli strings YY, IY and YI, and FIG. 13 shows an exemplary quantum circuit 1130 corresponding to the Pauli strings ZZ, IZ and ZI. In FIG. 12, $S^\dagger$ indicates a quantum gate to rotate an input quantum bit $-\pi/2$ around Z axis.

Figure 14:
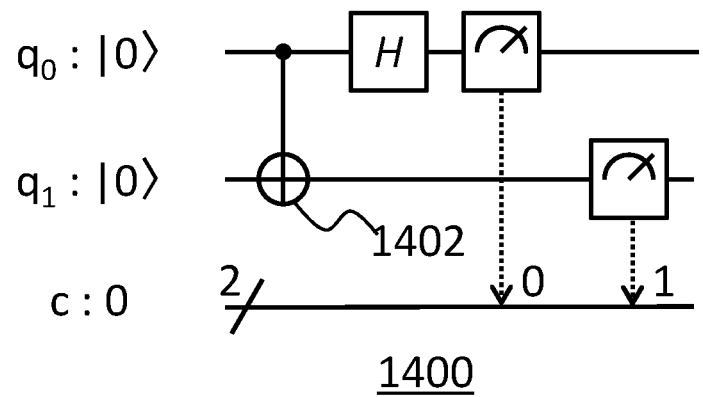
FIG. 14 shows an exemplary quantum circuit corresponding to the XX, YY, and ZZ.

FIG. 14 shows an exemplary quantum circuit 1400 corresponding to XX, YY, and ZZ. In FIG. 14, an operator shown by 1402 indicates a controlled NOT. For example, the designing section 150 designs the quantum circuit 1400 from the unitary matrix of Expression 6. According to the unitary matrix, with the output of the first bit of the quantum circuit 1400 being $x_0$ and the output of the second bit being $x_1$, $x_0x_1=00$ corresponds to $|\Psi^+\rangle$, $x_0x_1=10$ corresponds to $|\Phi^-\rangle$, $x_0x_1=01$ corresponds to $|\Psi^+\rangle$, and $x_0x_1=11$ corresponds to $|\Psi^-\rangle$.

Accordingly, with $p_{x_0x_1}$ being the probability of the result of $x_0x_1$, the expressions below are established for the respective expectation values <XX>, <YY>, <ZZ>, and <II> of the Pauli strings XX, YY, ZZ, and II.

$$\rangle XX\langle = p_{00}+p_{01}-p_{10}-p_{11}$$

$$\rangle YY\langle = p_{01}+p_{10}-p_{00}-p_{11}$$

$$\rangle ZZ\langle = p_{00}+p_{10}-p_{01}-p_{11}$$

$$\rangle XX\langle = p_{00}+p_{01}-p_{10}-p_{11} \quad \text{(Expression 7)}$$

Accordingly, by obtaining the outputs $x_0$ and $x_1$ of the quantum circuit 1400, collecting the probabilities $p_{x_0x_1}$, and manipulating these probabilities, it is possible to obtain all of the expectation values of the outputs from XX, YY, and ZZ. In other words, with a single quantum circuit 1400, it is possible to obtain all of the outputs of the Pauli strings XX, YY, ZZ, and II.

The designing section 150 may design a quantum circuit, such as the quantum circuit 1400 shown in FIG. 14, that is shared in each group generated at S760. Furthermore, the designing section 150 may design a classic circuit that collects and manipulates the output of the quantum circuit, in a manner to obtain the result corresponding to each Pauli string in a group.

The above describes a method for generating a circuit corresponding to a specific target set (II, XX, YY, ZZ). However, for any set, the designing section 150 may perform the diagonalization at S770, generate the unitary matrix at S780, and design the quantum circuit at S790. The above describes a method for generating a circuit corresponding to a portion (i.e. II, XX, YY, ZZ, and the like) of Pauli strings grouped based on a judgment of whether these Pauli strings are observables that are jointly measurable by entangled measurement, but it is clear that, for a circuit corresponding to a portion (e.g., II, IX, XI, XX, and the like) of Pauli strings grouped based on observables that are jointly measurable on a tensor product basis, the desired results can be obtained if the output is manipulated, without the need for generating a shared quantum circuit.

As shown in FIGS. 5 to 14, the apparatus 10 of the present embodiment uses the determination of whether Pauli strings are observables that are jointly measurable by entangled measurement. In this way, the apparatus 10 organizes the Pauli strings included in a qubit Hamiltonian into groups to improve the efficiency of the processing of the VQE.

The above describes a general processing flow, but here, an example in which the present embodiment is applied to an $H_2$ molecule is described as a specific example. For example, a Jordan-Wigner transformation is used to transform the Fermi Hamiltonian of an $H_2$ molecule that has undergone a second quantization into a qubit Hamiltonian. The Pauli strings included in the qubit Hamiltonian of the $H_2$ molecule are IIII, ZIII, IZII, IIZI, IIIZ, ZZII, ZIZI, YYXX, YYYY, XXXX, XXYY, ZIIZ, IZZI, IZIZ, and IIZZ.

Here, if a Pauli graph is generated from these 15 Pauli strings and the coloring algorithm is applied thereto, 5 groups can be generated. On the other hand, if entangled measurement is used such as in the present embodiment to generate a merged Pauli graph from Pauli graphs and the coloring algorithm is applied thereto, 2 groups can be generated. Therefore, according to the present embodiment, the processing can be performed 5/2 times faster compared to the case where entangled measurement is not used. Due to this, according to the present embodiment, the necessary number of the quantum circuit can be reduced.

In this way, according to a method of the present embodiment, it is possible to omit a portion of the processing in the second loop of the VQE, without losing accuracy, by using the observables that are jointly measurable by entangled measurement. Therefore, it is possible to provide a quantum circuit capable of executing a VQE with improved accuracy.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 15:
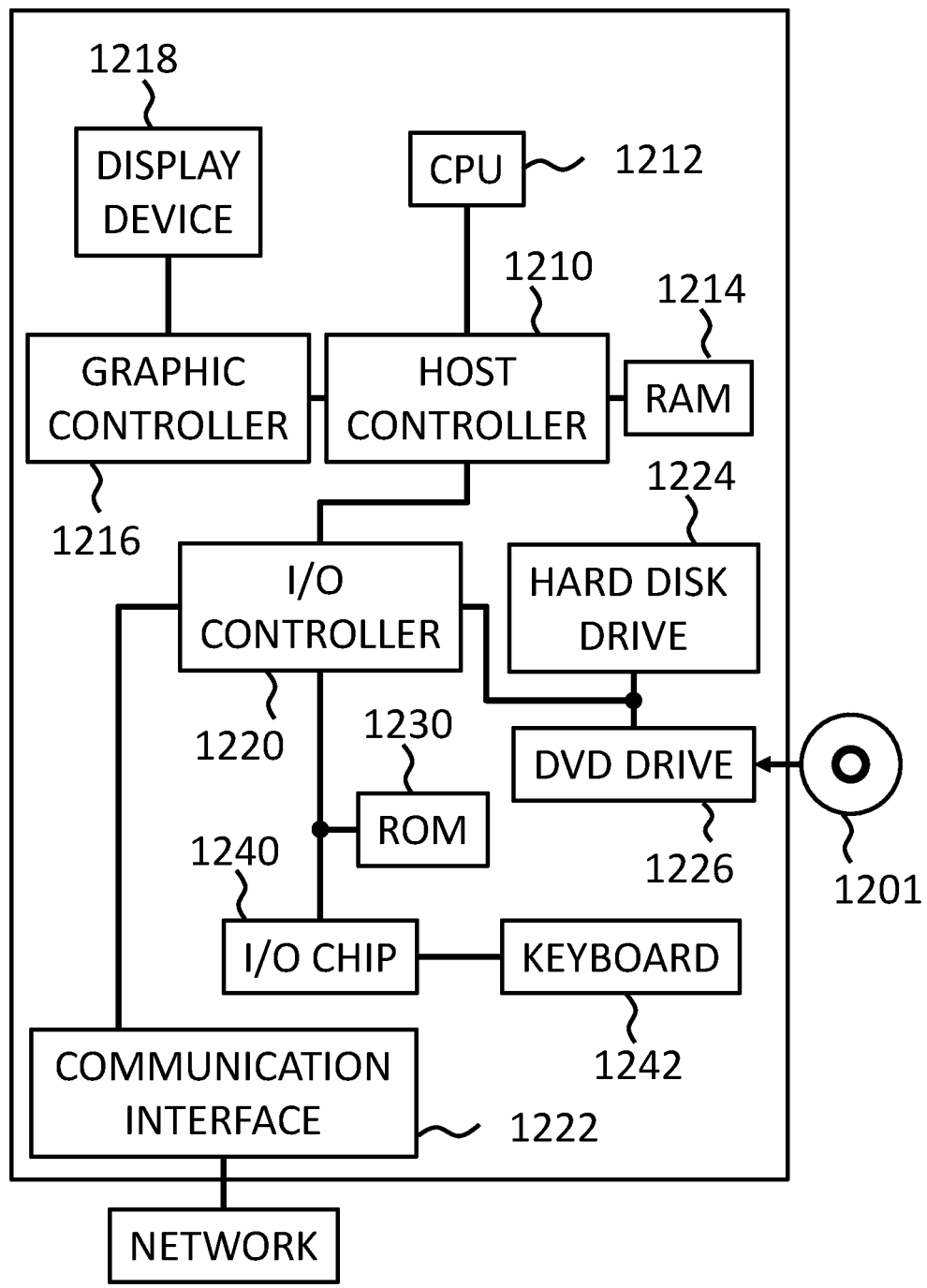
FIG. 15 shows an exemplary hardware configuration of a computer 1200.

FIG. 15 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method for designing quantum circuits, comprising:
   obtaining a plurality of Pauli strings included in a qubit Hamiltonian;
   grouping at least some of the plurality of Pauli strings, based on a judgment of whether some of the plurality of Pauli strings are observables that are jointly measurable by entangled measurement; and generating a quantum circuit based on a result obtained from the grouping.

2. The method according to claim 1, wherein the plurality of Pauli strings include K-letter Pauli strings, further comprising:
generating a plurality of sets in which k-letter (where k is a natural number less than or equal to K) Pauli strings are elements, where a number of elements in each set is $2^k$; and
identifying sets that are observables jointly measurable by entangled measurement, from the plurality of generated sets, wherein the grouping includes performing grouping according to the sets identified by the identifying.

3. The method according to claim 2, wherein the generating the plurality of sets includes generating all sets in which k-letter Pauli strings are elements and the number of elements in each set is 2k.

4. The method according to claim 1, wherein the grouping includes:
generating a Pauli graph including each of the plurality of Pauli strings as a node; and
generating a merged Pauli graph by merging at least some nodes in the Pauli graph, based on a judgment of whether Pauli strings corresponding to the at least some nodes among the plurality of Pauli strings are observables that are jointly measurable by entangled measurement, at least at some of the operators.

5. The method according to claim 4, wherein the generating the Pauli graph is performed by connecting a first Pauli string and a second Pauli string included among the plurality of Pauli strings with an edge, responsive to a determination that the first Pauli string and the second Pauli string are not observables that are jointly measurable on a tensor product basis, at least at one of the operators.

6. The method according to claim 4, wherein the grouping further includes separating nodes included in the merged Pauli graph into groups by applying a coloring algorithm to the merged Pauli graph.

7. The method according to claim 4, wherein the generating the merged Pauli graph includes merging nodes corresponding to the at least some of the Pauli strings, responsive to a determination that the at least some of the Pauli strings are observables that are jointly measurable by entangled measurement, at least at some of the operators at corresponding positions.

8. The method according to claim 4, wherein the generating the merged Pauli graph includes merging nodes corresponding to the at least some of the Pauli strings responsive to a determination that the at least some of the Pauli strings are observables that are jointly measurable by entangled measurement, that at least at some of the operators at corresponding positions, and that the at least some of the Pauli strings are observables that are jointly measurable on a tensor product basis, at remaining operators.

9. The method according to claim 1, wherein the designing a quantum circuit is performed, such that calculations of Pauli strings in a same group made by grouping are shared in the quantum circuit.

10. An apparatus for designing quantum circuits, comprising:
a processor or programmable circuitry; and
one or more non-transitory computer readable mediums collectively storing instructions, wherein the instructions, when executed by the processor or programmable circuitry, cause the processor or programmable circuitry to perform operations including:
obtaining a plurality of Pauli strings included in a qubit Hamiltonian;
grouping at least some of the plurality of Pauli strings, based on a judgment of whether some of the Pauli strings are observables that are jointly measurable by entangled measurement; and
generating a quantum circuit based on a result obtained from the grouping.

11. The apparatus according to claim 10, wherein the plurality of Pauli strings include K-letter Pauli strings, and the instructions further cause the processor or programmable circuitry to perform operations including:
generating a plurality of sets in which k-letter (where k is a natural number less than or equal to K) Pauli strings are elements, a number of elements in each set is $2^k$; and
identifying sets that are observables jointly measurable by entangled measurement, from the plurality of generated sets,
wherein, the grouping includes performing grouping according to the sets identified by the identifying.

12. The apparatus according to claim 11, wherein the generating the plurality of sets includes generating all sets in which k-letter Pauli strings are elements and the number of elements in each set is 2k.

13. The apparatus according to claim 10, wherein the grouping includes:
generating a Pauli graph including each of the plurality of Pauli strings as a node; and
generating a merged Pauli graph by merging at least some nodes in the Pauli graph based on a judgment of whether Pauli strings corresponding to the at least some nodes among the plurality of Pauli strings are observables that are jointly measurable by entangled measurement, at least at some of the operators.

14. The apparatus according to claim 13, wherein the generating the Pauli graph is performed by connecting a first Pauli string and a second Pauli string included among the plurality of Pauli strings with an edge, responsive to a determination that the first Pauli string and the second Pauli string are not observables that are jointly measurable on a tensor product basis, at least at one of the operators.

15. The apparatus according to claim 13, wherein the grouping further includes separating nodes included in the merged Pauli graph into groups by applying a coloring algorithm to the merged Pauli graph.

16. The apparatus according to claim 13, wherein the generating the merged Pauli graph includes merging nodes corresponding to the at least some of the Pauli strings, responsive to a determination that the at least some of the Pauli strings are observables that are jointly measurable by entangled measurement, at least at some of the operators at corresponding positions.

17. The apparatus according to claim 13, wherein the generating the merged Pauli graph includes merging nodes corresponding to the at least some of the Pauli strings responsive to a determination that the at least some of the Pauli strings are observables that are jointly measurable by entangled measurement, that at least at some of the operators at corresponding positions, and that the at least some of the Pauli strings are observables that are jointly measurable on a tensor product basis, at the remaining operators.

18. A computer program product for designing quantum circuits, comprising a non-transitory computer readable storage medium having instructions embodied therewith, wherein the instructions, when executed by a processor or programmable circuitry, cause the processor or programmable circuitry to perform operations including:
   obtaining a plurality of Pauli strings included in a qubit Hamiltonian;
   grouping at least some of the plurality of Pauli strings, based on a judgment of whether some of the Pauli strings are observables that are jointly measurable by entangled measurement; and
   generating a quantum circuit based on a result obtained from the grouping.

19. The computer program product according to claim 18, wherein the plurality of Pauli strings include K-letter Pauli strings, and the instructions further cause the processor or programmable circuitry to perform operations including:
   generating a plurality of sets in which k-letter (where k is a natural number less than or equal to K) Pauli strings are elements, a number of elements in each set is $2^k$; and
   identifying sets that are observables jointly measurable by entangled measurement, from the plurality of generated sets,
   wherein the grouping includes performing grouping according to the sets identified by the identifying.

20. The computer program product according to claim 19, wherein the generating the plurality of sets includes generating all sets in which k-letter Pauli strings are elements and the number of elements in each set is 2k.

21. The computer program product according to claim 18, wherein the grouping includes:
   generating a Pauli graph including each of the plurality of Pauli strings as a node; and
   generating a merged Pauli graph by merging at least some nodes in the Pauli graph based on a judgment of whether the Pauli strings corresponding to the at least some nodes among the plurality of Pauli strings are observables that are jointly measurable by entangled measurement, at least at some of the operators.

22. The computer program product according to claim 21, wherein the generating the Pauli graph is performed by connecting a first Pauli string and a second Pauli string included among the plurality of Pauli strings with an edge, responsive to a determination that the first Pauli string and the second Pauli string are not observables that are jointly measurable on a tensor product basis, at least at one of the operators.

23. The computer program product according to claim 21, wherein the grouping further includes separating nodes included in the merged Pauli graph into groups by applying a coloring algorithm to the merged Pauli graph.

24. The computer program product according to claim 1, wherein the generating the merged Pauli graph includes merging nodes corresponding to the at least some of the Pauli strings, responsive to a determination that the at least some of the Pauli strings are observables that are jointly measurable by entangled measurement, at least at some of the operators at corresponding positions.

25. The computer program product according to claim 21, wherein the generating the merged Pauli graph includes merging nodes corresponding to the at least some of the Pauli strings responsive to a determination that the at least some of the Pauli strings are observables that are jointly measurable by entangled measurement, that at least at some of the operators at corresponding positions, and that the at least some of the Pauli strings are observables that are jointly measurable on a tensor product basis, at the remaining operators.

* * * * *